(12) United States Patent
Umemoto

(10) Patent No.: US 6,659,615 B2
(45) Date of Patent: Dec. 9, 2003

(54) LIGHT PIPE AND METHOD FOR PRODUCING THE SAME

(75) Inventor: Seiji Umemoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 67 days.

(21) Appl. No.: 09/759,238

(22) Filed: Jan. 16, 2001

(65) Prior Publication Data

US 2001/0010630 A1 Aug. 2, 2001

(30) Foreign Application Priority Data

Jan. 13, 2000 (JP) ..................................... P. 2000-004240

(51) Int. Cl.⁷ .............................. F21V 7/04; G01D 11/28
(52) U.S. Cl. ........................... 362/31; 362/26; 385/901; 359/580
(58) Field of Search ............................. 362/26, 29, 31, 362/32, 302, 309, 331; 385/901; 359/580, 831, 599

(56) References Cited

U.S. PATENT DOCUMENTS

| | | | |
|---|---|---|---|
| 5,183,597 A | * | 2/1993 | Lu ............................. 264/1.38 |
| 5,339,179 A | | 8/1994 | Rudisill et al. |
| 5,341,231 A | | 8/1994 | Yamamoto et al. |
| 5,390,276 A | | 2/1995 | Tai et al. |

(List continued on next page.)

FOREIGN PATENT DOCUMENTS

| | | | |
|---|---|---|---|
| EP | 867 747 A2 | 9/1998 | |
| JP | 5-158033 | 6/1993 | |
| JP | 9-297222 | 11/1997 | ............ G02B/6/00 |
| JP | 10-106328 | 4/1998 | ............ F21V/8/00 |
| JP | 11-142618 | 5/1999 | |
| JP | 2000-147499 | 5/2000 | |
| TW | 338869 | 8/1998 | |
| WO | WO 97/01610 | 1/1997 | |
| WO | WO 97/30373 | 8/1997 | |
| WO | WO 97-47467 | 12/1997 | |

Primary Examiner—Sandra O'Shea
Assistant Examiner—Bao Truong
(74) Attorney, Agent, or Firm—Sughrue Mion, PLLC

(57) ABSTRACT

A light pipe has a transparent resin plate having an average in-plane retardation of not larger than 20 nm, a transparent film having an average in-plane retardation of not larger than 20 nm, and an adhesive layer having a refractive index different by 0.1 or less from that of the transparent film. The transparent film is bonded to the transparent resin plate through the adhesive layer and wherein in the transparent film includes a repetitive prismatic structure constituted by optical path control slopes which are disposed on an outer surface of the transparent film and which are aligned in a substantially predetermined direction so that each of the optical path control slopes is inclined at an inclination angle in a range of from 35 to 48 degrees with respect to a film plane.

17 Claims, 2 Drawing Sheets

U.S. PATENT DOCUMENTS

| | | | |
|---|---|---|---|
| 5,485,291 A | | 1/1996 | Qiao et al. |
| 5,584,556 A | | 12/1996 | Yokoyama et al. |
| 5,671,994 A | | 9/1997 | Tai et al. |
| 5,712,694 A | | 1/1998 | Taira et al. |
| 5,727,107 A | | 3/1998 | Umemoto et al. |
| 5,808,713 A | | 9/1998 | Broer et al. |
| 5,897,184 A | | 4/1999 | Eichanlaub et al. |
| 5,945,209 A | | 8/1999 | Okazaki et al. |
| 5,961,198 A | | 10/1999 | Hira et al. |
| 6,044,196 A | * | 3/2000 | Winston et al. ............. 349/159 |
| 6,060,183 A | * | 5/2000 | Higashi et al. ............. 349/117 |
| 6,130,730 A | | 10/2000 | Jannson et al. |
| 6,147,732 A | | 11/2000 | Aoyama et al. |
| 6,168,281 B1 | | 1/2001 | Suzuki |
| 6,196,692 B1 | | 3/2001 | Umemoto et al. |
| 6,199,995 B1 | | 3/2001 | Umemoto et al. |
| 6,236,439 B1 | * | 5/2001 | Saiki et al. .................. 349/117 |
| 6,322,236 B1 | * | 11/2001 | Campbell et al. ............. 362/19 |
| 6,334,689 B1 | | 1/2002 | Taniguchi et al. |
| 6,369,950 B1 | | 4/2002 | Umemoto |
| 6,375,336 B1 | | 4/2002 | Suzuki et al. |
| 6,384,881 B1 | * | 5/2002 | Arai et al. ..................... 349/61 |
| 6,454,452 B1 | | 9/2002 | Sasagawa et al. |
| 6,485,157 B2 | | 11/2002 | Ohkawa |
| 6,490,401 B2 | | 12/2002 | Cornelissen et al. |
| 2001/0009474 A1 | | 7/2001 | Umemoto et al. |
| 2001/0011779 A1 | * | 8/2001 | Stover ........................ 264/1.7 |
| 2001/0012158 A1 | | 8/2001 | Umemoto et al. |
| 2001/0012159 A1 | | 8/2001 | Umemoto et al. |
| 2001/0053029 A1 | | 12/2001 | Umemoto et al. |

* cited by examiner

LIGHT PIPE AND METHOD FOR PRODUCING THE SAME

BACKGROUND OF THE INVENTION

1. Field of the Invention

The present invention relates to a light pipe which is excellent in light utilizing efficiency and with which a liquid-crystal display device bright and easy to view can be formed, and further relates to a method for producing the light pipe.

The present application is based on Japanese Patent Application No. 2000-4240, which is incorporated herein by reference.

2. Description of the Related Art

As shown in FIG. 4, a reflection-transmission double type liquid-crystal display device comprising a side-lighting type light pipe 2 having a light source 21 on one of side surfaces of the light pipe 2, a reflection layer 3 disposed on the back surface of the light pipe 2, and a liquid-crystal display unit 4 having a liquid-crystal panel 42 and polarizers 41 and 43 disposed on the light exit side is heretofore known (see JP-A-10-106328). In the background-art reflection-transmission double type liquid-crystal display device, the light source is added while the merit of a reflection type liquid-crystal display device excellent in power saving is utilized so that the liquid-crystal device can serve as a transmission type liquid-crystal display device in a darkplace, or the like.

In a scattered reflection system through a satin-embossed structure, it was difficult to achieve bright display because exit light was shifted largely from a perpendicular direction. Therefore, the aforementioned light pipe was designed so that the optical path of light incident on one of side surfaces of the light pipe was controlled through reflection on prism-like irregular surfaces, whereby the light could be made to exit in a viewing direction with good perpendicularity to achieve display excellent in luminance. There was however a problem that display became dark in a reflection mode or in a transmission mode or a problem that an undesirable difference between darkness and brightness was formed easily in display.

SUMMARY OF THE INVENTION

It is an object of the present invention to develop a light pipe that can be used for forming a transmission type or reflection-transmission double type liquid-crystal display device which is bright, which is excellent in uniformity of brightness and which is good in display quality.

According to the present invention, there is provided a light pipe comprising: a transparent resin plate having an average in-plane retardation of not larger than 20 nm; a transparent film having an average in-plane retardation of not larger than 20 nm; and an adhesive layer having a refractive index different by 0.1 or less from that of the transparent film, wherein the transparent film is bonded to the transparent resin plate through the adhesive layer; and wherein the transparent film includes a repetitive prismatic structure constituted by optical path control slopes which are disposed on an outer surface of the transparent film and which are aligned in a substantially predetermined direction so that each of the optical path control slopes is inclined at an inclination angle in a range of from 35 to 48 degrees with respect to a film plane. There is further provided a method for producing a light pipe, comprising the steps of: forming a repetitive prismatic structure on one surface of a transparent film through a mold having a predetermined prismatic structure; providing an adhesive layer on a surface of the transparent film on which the repetitive prismatic structure is not formed; molding the transparent film and a transparent resin plate into predetermined shapes respectively; and bonding the transparent film to the transparent resin plate through the adhesive layer provided on the transparent film.

In use of the light pipe according to the present invention, there can be formed a transmission type or reflection-transmission double type liquid-crystal display device which hardly generates display unevenness caused by lowering of brightness, variation in brightness, etc., which is bright, which is excellent in uniformity of brightness and which is good in display quality. It has been found that the cause of lowering of luminance and occurrence of an undesirable difference between darkness and brightness in the background-art light pipe is a retardation of the background-art light pipe. Thus, the present invention is to reduce the retardation of the light pipe as largely as possible on the basis of this finding.

That is, the retardation of the light pipe seems to have little influence when luminance of the light pipe per se is evaluated. However, when the light pipe is used for a back-lighting system, or the like, in a liquid-crystal display device, the retardation becomes a cause of elimination or change of the polarization state. Hence, the quantity of light effectively utilized for liquid-crystal display is reduced totally or partially, so that the reduction of the quantity of light becomes a cause of lowering of luminance and occurrence of an undesirable difference between darkness and brightness. When the light pipe is used for liquid-crystal display, it is therefore necessary to reduce the retardation of the light pipe as largely as possible so that the state of polarization through polarizers, or the like, can be retained as sufficiently as possible. The background-art light pipe is generally formed by an injection molding system. In such a molding system according to the background art, a light pipe large in retardation and partially large in variation of retardation is apt to be produced because optical distortion based on molecular alignment, or the like, is apt to occur.

Hence, in the light pipe according to the preset invention, light incident on one of side surfaces of the light pipe is reflected on the optical path control slopes with good directivity so that light favorable to visibility can be generated efficiently. In such a manner, bright display can be achieved in a transmission mode. Further, when the optical path control slopes are combined with flat surfaces having an area of not smaller than 10 times as large as the area of the optical path control slopes, and when a reflection layer is provided on the back surface of the light pipe, the light pipe is excellent both in efficiency of entrance of external light and in efficiency of transmission of the light after reflection. Hence, not only bright display in a reflection mode but also bright display in a transmission mode as described above can be achieved. Hence, a transmission type or reflection-transmission double type liquid-crystal display device which is bright and which is excellent in uniformity of brightness can be obtained.

Features and advantages of the invention will be evident from the following detailed description of the preferred embodiments described in conjunction with the attached drawings.

DETAILED DESCRIPTION OF THE PREFERRED EMBODIMENTS

Figure 1:
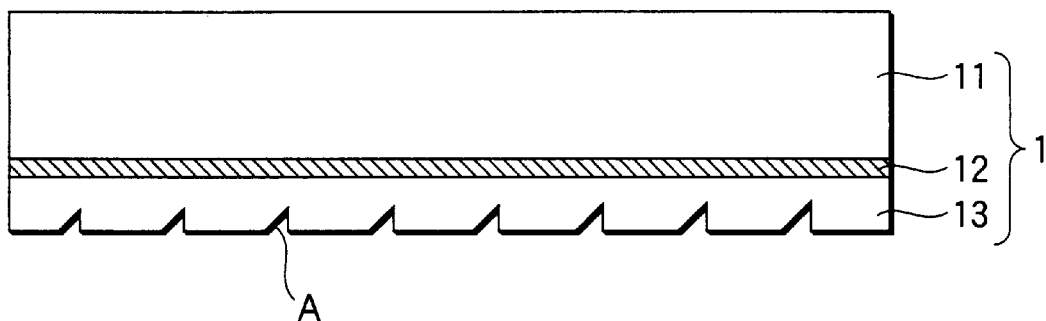
FIG. 1 shows a side view of an example of a light pipe.
Figure 2:
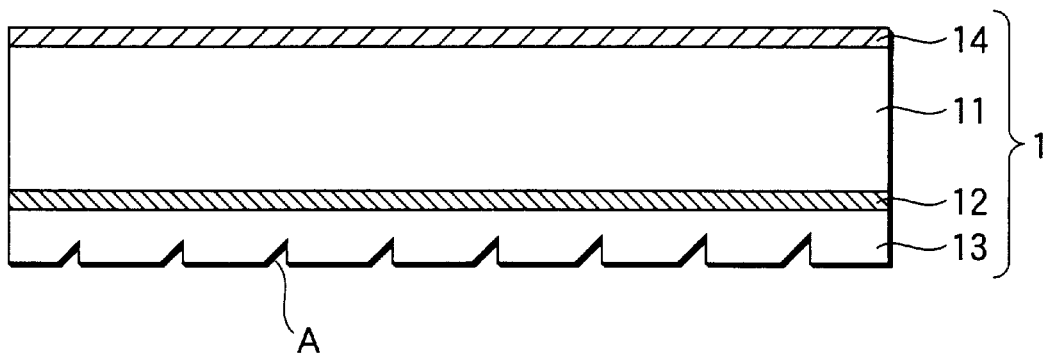
FIG. 2 shows a side view of another example of the light pipe.

The light pipe according to the present invention comprises: a transparent resin plate having an average in-plane retardation of not larger than 20 nm; a transparent film having an average in-plane retardation of not larger than 20 nm; and an adhesive layer having a refractive index different by 0.1 or less from that of the transparent film, wherein the transparent film is bonded to the transparent resin plate through the adhesive layer; and wherein the transparent film includes a repetitive prismatic structure constituted by optical path control slopes which are disposed on an outer surface of the transparent film and which are aligned in a substantially predetermined directions that each of the optical path control slopes is inclined at an inclination angle in a range of from 35 to 48 degrees with respect to a film plane. FIG. 1 and 2 show examples of the light pipe. A light pipe 1 is constituted by a transparent resin plate 11, an adhesive layer 12 and a transparent film 13. A plurality of optical path changing means A function as units for forming a repetitive prismatic structure of having optical path control slopes.

As shown in FIGS. 1 and 2, the transparent resin plate is made of a plate-like material 11 having an upper surface, a lower surface opposite to the upper surface, and side surfaces between the upper and lower surfaces. At least one side surface of the material 11 is used as an incidence side surface on which light from a light source is made incident. Light incident on the at least one incidence side surface is reflected on the plurality of optical path changing means A of the transparent film 13 bonded to one of the upper and lower surfaces so that the reflected light can exit from the other of the upper and lower surfaces. That is, a plate having an average in-plane retardation of not larger than 20 nm in the upper/lower surface direction is used as the transparent resin plate.

It is preferable, from the point of view to prevent display unevenness, that the average in-plane retardation in the transparent resin plate is not larger than 18 nm, particularly not larger than 16 nm, more particularly not larger than 14 nm. It is more preferable that variation in in-plane retardation between positions of the transparent resin plate is as small as possible. A transparent resin plate having such a small retardation can be formed by a suitable system such as a system in which internal optical distortion is removed, for example, by sintering of an existing resin plate, or the like. The preferable system is a system in which a transparent resin plate small in retardation is formed by a casting system so as to cut into a plurality of transparent resin plates each having a predetermined shape as a target.

Incidentally, the whole surface of the light pipe need not satisfy the retardation condition. It will go well if a region of the light pipe used for display satisfies the retardation condition in the transparent resin plate. That is, the whole region used for display in the light pipe needs to satisfy the condition. It is further preferable that the retardation is based on light in a visible light range, especially light with a wavelength of 550 nm. Further, it is preferable that the retardation is as uniform as possible over the whole surface of the transparent resin plate. Especially, it is preferable that the maximum value of the retardation is larger by 20 nm or less, more preferably, by 15 nm or less than the average retardation of the transparent resin plate.

As shown in the drawings, the transparent resin plate may be of a uniform thickness type or may be formed so that a counter end opposite to the incidence side surface is thinner than the incidence side surface. That is, the transparent resin plate can be formed into a suitable shape. Reduction in thickness of the counter end is advantageous in terms of reduction in weight, improvement in entrance efficiency of light entering from the incidence side surface toward the optical path changing means, and so on. The surface of the transparent resin plate can be also formed into a suitable shape such as a straight-line shape, a curved shape, or the like.

Hence, the shape of each of the upper and lower surfaces and side surfaces of the transparent resin plate is not particularly limited and maybe determined suitably. Generally, the surface where the transparent film is not provided is formed as a flat surface. The side surface perpendicular to the flat surface is formed as an incidence side surface. For example, the incidence side surface may be shaped like a curved concave in accordance with the outer circumference of the light source so that improvement in entrance efficiency can be attained. Furthermore, the incidence side surface may be formed as an incidence side surface structure having an introduction portion interposed between the incidence side surface and the light source. The introduction portion can be formed into a suitable shape in accordance with the shape of the light source, or the like.

The thickness of the transparent resin plate can be determined suitably in accordance with the size of the light pipe, the size of the light source, the degree of the retardation, etc. on the basis of the purpose of use. When the transparent resin plate is used to form a liquid-crystal display device, or the like, the thickness of the transparent resin plate is generally not larger than 5 mm, especially in a range of from 0.1 to 3 mm, more especially in a range of from 0.3 to 2 mm on the basis of the thickness of the incidence side surface. Incidentally, the transparent resin plate may be formed as a laminate of plates or sheets made of one kind of material or different kinds of materials, for example, for the purpose of controlling the retardation, or the like. That is, the transparent resin plate need not be formed as an integrated single body made of one kind of material.

As shown in the drawings, the transparent film 13 is bonded to one surface of the transparent resin plate 11. The purpose of the transparent film 13 is as follows. Light incident on the incidence side surface of the transparent resin plate 11 or transmission light of the incident light is reflected on the optical path control slopes so that the optical path of the light is changed. Accordingly, the light can be made to exit from the surface of the transparent resin plate on which the transparent film is not formed. The exit light is used as the illumination light (display light) of the liquid-crystal panel or the like. In the present invention, the transparent film 13 is provided as a film having an average in-plane retardation of not larger than 20 nm. From the point of view to prevent display unevenness, it is preferable that the average in-plane retardation of the transparent film is not larger than 15 nm, especially not larger than 12 nm, more especially not larger than 10 nm. It is more preferable to reduce variation in in-plane retardation between positions of the transparent film as largely as possible.

Incidentally, the whole surface of the light pipe need not satisfy the aforementioned retardation condition. It will go well if a region of the light pipe used for display satisfies the aforementioned retardation condition. That is, the whole region used for display in the-transparent film is required to satisfy the retardation condition. The aforementioned retardation is preferably based on light in a visible range, more preferably based on light with a wavelength of 550 nm. Further, it is preferable that the retardation is as uniform as possible over the whole surface of the transparent film. Especially, it is preferable that the maximum value of the retardation is larger by 20 nm or less, more preferably, by 15 nm or less than the average retardation of the transparent film.

Figure 3A:
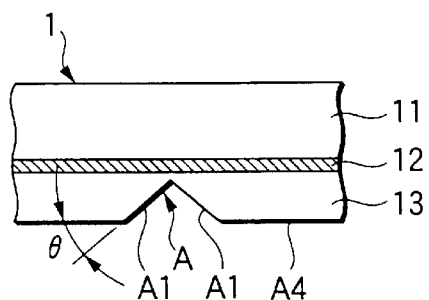
FIGS. 3A to 3F show side views of optical path changing means in a transparent film.

From the point of view to achieve the foregoing object, the transparent film 13 is provided, on its outer surface, with slopes A1 on which light incident on a side surface or transmission light of the incident light is reflected in a predetermined direction so that the optical path of the light is changed as shown in FIGS. 3A to 3F. In this case, according to the present invention, from the point of view to change the optical path to obtain illumination light excellent in frontal directivity, the transparent film 13 is designed to have a repetitive prismatic structure, that is, a repetitive structure of a plurality of optical path changing means A with optical path control slopes A1 aligned in a substantially fixed direction at an inclination angle θ in a range of from 35 to 48 degrees with respect to a film plane A4, as shown in FIG. 3A.

Figure 3B:
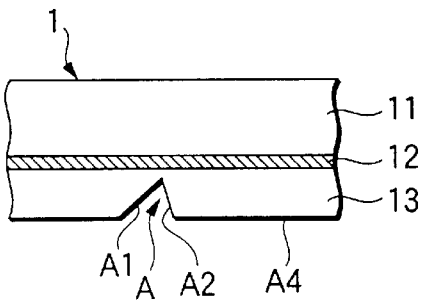
Figure 3C:
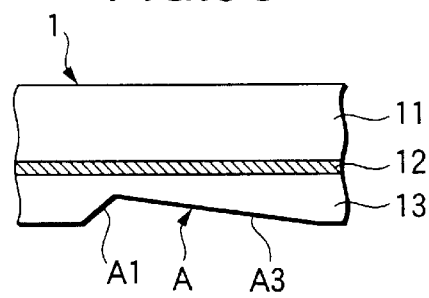
Figure 3D:
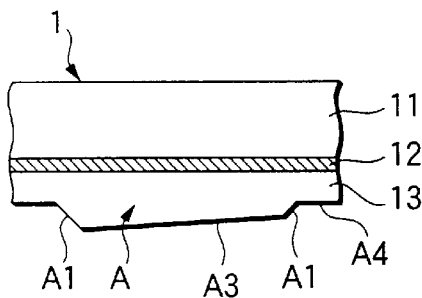
Figure 3E:
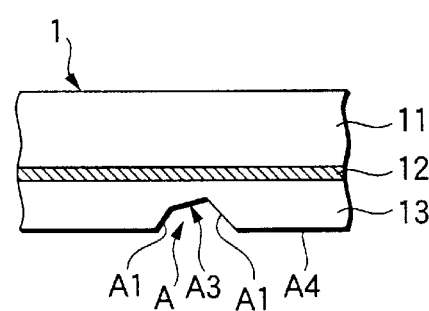
Figure 3F:
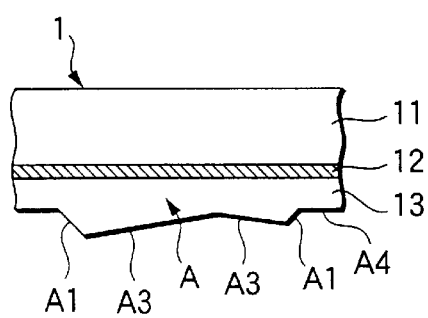

FIGS. 3A to 3F show examples of the plurality of optical path changing means A with the optical path control slopes A1 described above. In FIG. 3A to 3C, each of the plurality of optical path changing means A is substantially shaped like a triangle in section. In FIGS. 3D and 3E, it is substantially shaped like a tetragon in section. In FIG. 3F, it is substantially shaped like a pentagon in section. Further, in FIG. 3A, each of the plurality of optical path changing means A has two optical path control slopes A1 forming equal sides of an isosceles triangle. In FIG. 3B, each of the plurality of optical path changing means A has an optical path control slope A1, and a steep slope A2 having a larger inclination angle than that of the slope A1. In FIG. 3C, a repetitive structure is formed all over one side of the film. In the repetitive structure, a plurality of optical path changing means A each of which has an optical path control slope A1 and a gentle slope A3 having a smaller inclination angle than that of the slope A1 are continuously adjacent to one another. In FIGS. 3D and 3F, the plurality of optical path changing means A are constituted by convex portions (protrusions). In FIG. 3E, the plurality of optical path changing means A are constituted by concave portions (grooves).

As described above, therefore, the plurality of optical path changing means may be constituted by convex or concave portions made of equilateral sides or slopes with equal inclination angles, or may be constituted by convex or concave portions each made of a combination of an optical path control slope and a steep or gentle slope, or each made of slopes different in inclination angle from one another. The format of the slopes may be determined suitably in accordance with the number and positions of side surfaces on which light is made incident. From the point of view to improve mar-proofness to retain the function of the slopes, it is advantageous to form the optical path changing means of concave portions rather than convex portions because the slopes, or the like, of the concave portions are rarely damaged.

From the point of view to achieve the aforementioned characteristic such as frontal directivity, or the like, it is preferable that the transparent film is formed so that the optical path control slopes A1 are aligned in a substantially fixed direction and so that the slopes A1 face the side surface on which light is incident from the light source. Therefore, for example, when at least two side surfaces of the light pipe are used as the incidence side surfaces, it is preferable to use a transparent film provided with optical path control slopes A1 corresponding to the number and positions of the incidence side surfaces.

Incidentally, in the case where two side surfaces of the light pipe are used as the incidence side surfaces, it is preferable to use a transparent film 11 having two or more kinds of surfaces including one kind of optical path control slopes A1 which are aligned in a substantially fixed direction and which serve as a reference, and another kind of optical path control slopes which are aligned in an opposite direction to the substantially fixed direction. That is, as shown in FIG. 3A, the ridgelines of the two kinds of optical path control slopes A1 of the plurality of optical path changing means A each of which is substantially shaped like an isosceles triangle in section go along the aforementioned incidence side surfaces. Alternatively, as shown in FIGS. 3D, 3E and 3F, the ridgelines of the two kinds of optical path control slopes A1 of the plurality of optical path changing means A each of which is substantially shaped like a trapezoid, a tetragon or a pentagon in section go along the incidence side surfaces.

On the other hand, in the case where two side surfaces of the light pipe which are crosswise adjacent to each other are used as the incidence side surfaces, it is preferable to use a transparent film having optical path control slopes A1 the ridgelines of which go along the two crosswise directions corresponding to the incidence side surfaces. Further, in the case where at least three side surfaces of the light pipe which include opposite ones and crosswise ones are used as the incidence side surfaces, it is preferable to use a transparent film having optical path control slopes A1 having the aforementioned combination.

As described above, the optical path control slopes A1 play a role in reflecting, on the slopes A1, the light of the light incident on the side surface(s) and of the transmission light of the incident light, so as to change the optical path of the light. Then, the inclination angle of the optical path control slopes A1 with respect to the film plane is set to be in a range of from 35 to 48 degrees. Thus, the optical path of the light incident on the side surface(s) or the transmission light of the incident light can be changed with good perpendicularity to the film plane so that illumination light excellent in frontal directivity can be obtained efficiently.

If the aforementioned inclination angle were smaller than 35 degrees, the optical path of the reflected light would be shifted largely at an angle of not smaller than 30 degrees with respect to the frontal direction. Thus, it would be difficult to use the reflected light effectively for display, and the frontal luminance would be poor. On the contrary, if the inclination angle exceeded 48 degrees, light leaking from the optical path control slopes would increase due to the contrariety to the condition that the light incident on the side surface(s) or the transmission light of the incident light is totally reflected. Thus, the efficient utilization of the light incident on the side surface(s) would deteriorate. From the point of view to change the optical path with good frontal directivity or to restrain the light from leaking, or the like, the inclination angle of the optical path control slopes A1 is preferably in a range of from 38 to 45 degrees, more preferably in a range of from 40 to 44 degrees in consideration of the total reflection condition based on refraction of the light transmitted in the light pipe in accordance with Snell's law, and so on.

The plurality of optical path changing means A having the optical path control slopes A1 are generally formed as a repetitive prismatic structure in order to make the transparent film thinner. In this case, if it is necessary to reflect the light incident on at least one side surface backward and efficiently transmit the reflected light to another side surface opposite to the incidence side surface so as to emit the light from the whole surface of the light pipe as uniformly as possible, preferably, the structure includes flat surfaces. Then, as illustrated in FIGS. 3A to 3F, each flat surface is constituted by a gentle slope A3 with an inclination angle of not larger than 5 degrees, particularly with an inclination angle of not larger than 4 degrees, more particularly with an inclination angle of not larger than 3 degrees, with respect to the film plane, or a film surface A4 with an inclination angle of substantially 0 degree with respect to the film plane. Therefore, the plurality of optical path changing means A including the steep slopes A2, as illustrated in FIG. 3B, are preferably formed as a structure in which the angle of the steep slopes A2 is set to be not smaller than 35 degrees, particularly to be not smaller than 50 degrees, more particularly to be not smaller than 60 degrees, so as to enlarge the width of the film surface A4.

Figure 4:
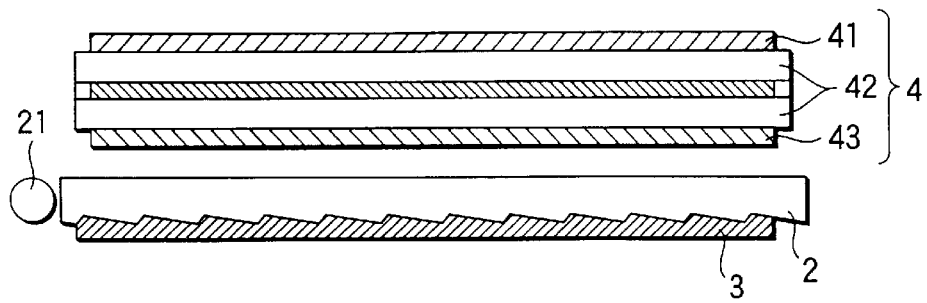
FIG. 4 shows a sectional view of an example of a reflection-transmission double type liquid-crystal display device.

In addition, as shown in FIG. 4, when a reflection layer 3 is disposed on the back surface of the light pipe, that is, on the back surface of the transparent film 13, the aforementioned flat surfaces constituted by the gentle slopes A3 or the film surfaces A4 can be made to function as incidence portions on which external light is incident and as transmission portions through which the light reflected on the reflection layer 3 is transmitted. As a result, display can be made in the reflection mode by use of external light when the light source(s) turned off. Thus, it is possible to form a reflection-transmission double type liquid-crystal display device.

In the above-mentioned case, particularly when the transparent film 13 has a repetitive structure of the plurality of optical path changing means A in which the means A are constituted by the slopes A1 and A3 and which are repeated adjacently to one another as shown in FIG. 3C, it is preferable to set any difference in inclination angle between any two gentle slopes A3 with respect to the film plane to be not larger than 5 degrees, more preferably not larger than 4 degrees, further preferably not larger than 3 degrees, on the whole surface of the transparent film 13. Further, it is preferable to set any difference in inclination angle between adjacent gentle slopes to be not larger than 1 degree, more preferably to be not larger than 0.3 degree, further preferably to be not larger than 0.1 degree. This difference setting is to prevent the optical path of the reflected light on the gentle slope A3 from changing largely, particularly to prevent the optical path between adjacent gentle slopes from changing largely. The same thing can be applied to the case of the transparent film 13 in which the plurality of optical path changing means A are constituted by the slopes A1 and A3 as shown in FIG. 3F.

In addition, from the point of view to obtain bright display in the external light mode, it is preferable that the projected area or width, onto the filmplane, of the flat surfaces is made not smaller than 10 times, especially not smaller than 12 times, more especially not smaller than 15 times as large as the project area or width, onto the film plane, of the slopes A1 or A2. The flat surfaces are constituted by the gentles lopes A3 having an inclination angle of not larger than 5 degrees with respect to the film plane or by the film surfaces A4, while the slopes A1 or A2 constituting the plurality of optical path changing means A have an inclination angle of not smaller than 35 degrees with respect to the film plane. This projected area or width setting is to improve the entrance efficiency of external light and the transmission efficiency of the light reflected on the reflection layer.

The plurality of optical path changing means A are provided so that their ridgelines extend in parallel to or with inclination to the incident side surface. In this case, the optical path changing means A may be formed from one end to the other end of the transparent film continuously, or discontinuously. When the optical path changing means A are formed discontinuously, it is preferable that the length of prismatic structures of the plurality of optical path changing means A, which are constituted by grooves or protrusions, in the direction along the incidence side surface is made not smaller than 5 times as large as the depth or height of the prismatic structures from the point of view of the entrance efficiency of transmission light or the optical path changing efficiency, or the like. In addition, the aforementioned length is preferably set to be in a range of not larger than 500 $\mu$m, more preferably in a range of from 10 to 480 $\mu$m, further preferably in a range of from 50 to 450 $\mu$m, from the point of view of uniform light emission on the light pipe.

Each of slopes which form the plurality of optical path changing means A may be formed into a suitable surface form such as a straight-line surface, abent surface, a curved surface, or the like. There is no particular limit on the sectional shape of the plurality of optical path changing means A and on the repetition pitch of the optical path control slopes A1. The optical path control slopes A1 are luminance determining factors in the transmission (lighting) mode. Therefore, the optical path control slopes A1 can be determined suitably in accordance with the uniformity of light emission on the light pipe or the uniformity of light emission in the external light mode in the reflection-transmission double type liquid-crystal display device. Thus, the quantity of optical-path-changed light can be controlled by the distribution density of the optical path control slopes A1.

Accordingly, the inclination angle, or the like, of the slopes A1 (A2 or A3) may be fixed all over the surface of the transparent film 13. Alternatively, in order to cope with absorption loss or attenuation of transmission light caused by the changing of its optical path so as to uniformalize light emission on the light pipe, the plurality of optical path changing means A may be made larger as the position goes farther from the side surface on which light is incident. Alternatively, the plurality of optical path changing means A may be made to have a fixed pitch, or the means A may be made to have a pitch which is reduced gradually to thereby increase the distribution density of the optical path changing means A as the position goes farther from the side surface on which light is incident. Further, uniform light emission may be attained on the light pipe by a random pitch. Thus, the optical path changing means A may be formed by the combination of prismatic structures different in shape, pitch, and so on.

In the case where a reflection-transmission double type liquid-crystal display device is formed, if the optical path control slopes A1 overlap with pixels of the liquid-crystal display panel, display may be unnatural due to insufficient transmission of display light. From the point of view to prevent such insufficient transmission, or the like, it is preferable that the overlapping area is made as small as possible, so as to ensure sufficient light transmission factor through the flat surfaces A3 or A4. From this point of view and in consideration of the fact that the pixel pitch of the liquid-crystal display panel is generally in a range of from 100 to 300 μm, it is preferable that the optical path control slopes A1 are formed so that the projected width of the slopes A1 on the film plane is not larger than 40 μm, especially in a range of from 3 to 20 μm, more especially in a range of from 5 to 15 μm. It is preferable to set the projected length to such a value, from the point of view that the coherence length of a fluorescent tube is generally set to be about 20 μm, and from the point of view to prevent the display quality from deterioration due to diffraction.

From the aforementioned point of view, it is preferable that the optical path control slopes A1 have large intervals. On the other hand, the optical path control slopes A1, however, function as substantial portions for forming illumination light based on changing of the optical path of the incident light on the side surface as mentioned above. Accordingly, if the interval were too large, illumination might be sparse at the time of lighting so as to make display unnatural. In consideration of this point of view, it is preferable that the repetition pitch of the optical path control slopes A1 is set to be not larger than 5 mm, particularly in a range of from 20 μm to 3 mm, more particularly in a range of from 50 μm to 2 mm.

When the optical path changing means are formed on the basis of a repetitive prismatic structure, moire may occur because of interference between the optical path changing means and the pixels of the liquid-crystal display panel. Although moire can be prevented by adjustment of the pitch of the repetitive structure, there is a preferable range in the pitch of the repetitive structure as mentioned above. Hence, there occurs a problem in the measures against the case where moire still occurs even though the pitch is in the aforementioned preferable range. According to the present invention, the prismatic structures are preferably formed such that ridgelines of the prismatic structures are inclined with respect to the incidence side surface. Thus, the repetitive prismatic structure can be arrayed to cross the pixels so as to prevent moire from occurring.

On the aforementioned occasion, if the inclination angle with respect to the incidence side surface were too large, deflection would occur in reflection of the light on the optical path control slopes A1. As a result, large deviation would occur in the direction of the changed optical path. This large deviation would be apt to cause lowering of display quality. From this point of view, the inclination angle of the ridgelines of the prismatic structures with respect to the incidence side surface is preferably set to be in a range of ±30 degrees, more preferably in a range of ±25 degrees. Incidentally, the symbol "±" means the direction of inclination of the ridgelines with the incidence side surface as a reference. If the resolution of the liquid-crystal display panel is low enough not to produce moire, or if moire is negligible, it is preferable that such ridgelines are formed to be as parallel with the incidence side surface as possible.

The aforementioned transparent resin plate or transparent film may be made of a suitable material in accordance with the wavelength range of the light source(s) and exhibiting transparency in accordance with the wavelength range of the light source (s). Incidentally, examples of the material used in a visible light range include transparent resins represented by an acrylic resin, a polycarbonate resin, a cellulose resin and a norbornene resin, or the like. Especially, a material exhibiting no birefringence or small birefringence is preferably used from the point of view to make the average in-plane retardation not larger than 20 nm. Further, internal stress may occur in the transparent film when an adhering process is applied thereto. From the point of view to prevent the retardation from being produced by such internal stress, a material having a small photo elastic coefficient is preferably used as the material of the transparent film.

The transparent film can be formed by a suitable method such as: a method in which a thermoplastic resin is pressed against a mold capable of forming a predetermined shape by heating to thereby transfer the shape to the thermoplastic resin; a method in which a mold capable of forming a predetermined shape is filled with a hot-melted thermoplastic resin or with a resin fluidized by heat or by a solvent; a method in which a fluid resin polymerizable by heat, by ultraviolet rays or by radial rays such as electron rays, or the like, is polymerized in the condition that the fluid resin is cast in a mold capable forming a predetermined shape or the mold is filled with the fluid resin; or the like.

A preferable method for forming the transparent film is a method in which a repetitive prismatic structure with optical path control slopes is given to one side of the transparent film by use of a mold having a predetermined prismatic structure. An example of such a preferable method is a method in which: one side of a transparent film small in retardation is coated with a curable resin polymerizable by ultraviolet rays or by radial rays, or the like; the coating layer is cured by irradiation with ultraviolet rays or with radial rays, or the like, while being brought into tight contact with the surface of the mold in which the predetermined prismatic structure has been formed; and the transparent film obtained thus is stripped off and collected from the mold.

The transparent film may be provided integrally with the optical path changing means by integral molding as described above, or may be provided separately with the optical path changing means provided on one side of the transparent film. In the latter case, if there is a large difference in refractive index between the added optical path changing means and the transparent film, light emit efficiency may be reduced largely because of interface reflection, or the like, between the optical path changing means and the transparent film. From the point of view to prevent the reduction in light exit efficiency, the difference in refractive index between the transparent film and the added optical path changing means is made preferably as small as possible, more preferably to be not larger than 0.10, further preferably to be not larger than 0.05. In addition, in this circumstance, it is preferable that the refractive index of the added optical path changing means is made higher than that of the transparent film from the point of view of the light exit efficiency. The thickness of the transparent film can be determined suitably. From the point of view to achieve reduction in thickness, generally, the thickness of the transparent film is preferably set to be not larger than 300 μm, more preferably in a range of from 5 to 200 μum, further preferably in a range of from 10 to 100 μm.

For example, the light pipe can be produced by a suitable laminating method as follows. An adhesive layer is provided on a surface of a transparent film on which no repetitive prismatic structure is provided. The transparent film is molded into a predetermined shape. On the other hand, a transparent resin plate is molded into a predetermined shape. The transparent film is bonded to the transparent resin plate through the adhesive layer provided on the transparent film. As occasion demands, the transparent resin plate with the transparent film is heated and pressed so as to fix/stabilize the adhesion between the transparent resin plate and the transparent film. As shown in the drawings, the transparent film 13 can be bonded to one side of the transparent resin plate 11 through the adhesive layer 12 by such a suitable laminating method so that the surface of the transparent film 13 on which the repetitive prismatic structure is formed is disposed outside.

The bonding process through the adhesive layer 12 is aimed at improvement of reflection efficiency on the optical path control slopes A1 of the plurality of optical path changing means A and, accordingly, aimed at improvement of luminance by effective utilization of the light incident on the incidence side surface. In this case, an adhesive layer having a refractive index different by 0.1 or less, particularly by 0.05 or less from that of the transparent film is preferably used in the present invention from the point of view to suppress the quantity of light which is enclosed by the light pipe due to interface reflection and which is unable to be made to exit, that is, from the point of view to suppress loss in the quantity of light due to the enclosure by the light pipe. For the same reason, the difference in refractive index between the transparent resin plate and the adhesive layer is also preferably set to be not larger than 0.1, more preferably not larger than 0.05.

The adhesive layer may contain suitable transparent particles. Examples of the transparent particles include: inorganic particles, which may be conductive, such as silica, alumina, titania, zirconia, tin oxide, indium oxide, cadmium oxide, antimony oxide, or the like; and organic particles such as crosslinked or non-crosslinked polymer, or the like. In this case, the adhesive layer can be formed as a light diffusion type.

As occasion demands, a reflection layer may be disposed closely on the optical-path-control-slopes-forming surface of the transparent film in the light pipe. The object of such a reflection layer is to reflect and invert the light leaking from the surface of the transparent film and to make the leaking light enter the transparent film again so as to improve the light utilizing efficiency or so as to form a reflection-transmission double type liquid-crystal display device.

The reflection layer may be formed of a suitable material such as a white sheet similar to that used in the background art. Particularly, examples of the reflection layer include: a coating layer containing powder of a high-reflectance metal such as aluminum, silver, gold, copper, chromium, or powder of an alloy of such metals in a binder resin; a layer in which the metal or a dielectric multi-layer film is deposited by a suitable thin film forming system such as a vacuum vapor deposition system, a sputtering system, or the like; a reflection sheet having such a coating or deposited layer supported by a base material composed of a film or the like; a sheet of metal foil; and so on. Such a high reflectance reflection layer is particularly preferably in the case where a reflection-transmission double type liquid-crystal display device is formed.

The reflection layer to be formed may exhibit a light diffusion function. Reflected light is diffused on a diffuse reflection surface so that the frontal directivity can be enhanced. In addition, when such a light diffusion function is based on surface roughening, Newton rings due to tight contact between the reflection layer and the transparent film is prevented from being produced so that visibility can be improved.

For example, the light diffusion type reflection layer can be formed by a surface roughening system using sandblasting, matting, or the like; or by a system in which the surface of a film base material, or the like, is formed into a fine prismatic structure by a suitable system such as a particle addition system, or the like, and in which a reflection layer is provided on the film base material, or the like, so as to reflect the fine prismatic structure; and so on. The formation of the surface of the reflection layer into the fine prismatic structure by reflecting the fine prismatic structure on the surface of the base material can be done by a system in which a metal is deposited on the surface of the film base material, or the like, by a suitable system, for example, a vapor deposition system such as a vacuum vapor deposition system, an ion plating system, a sputtering system, or the like, or a plating system.

As occasion demands, a suitable optical layer such as a light diffusing layer 14, an anti-reflection layer, etc. as shown in FIG. 2 may be provided on the non-transparent-film-providing surface of the transparent resin plate in the light pipe, that is, on the surface serving as a light exit surface. The optical layer such as a light diffusing layer 14, an anti-reflection layer, etc. can be made of a suitable material similar to that used in the background art without any particular limit.

In the light pipe according to the present invention, light incident on its upper or lower surface can be transmitted efficiently through the lower or upper surface, respectively, so that a good state of polarization is retained. As shown in FIG. 4, when the light pipe is used as a side-lighting type light pipe so that a surface light source unit is composed of the side-lighting type light pipe and at least one light source 21 disposed on one side surface of the light pipe, accurately collimated light can be made to exit in a direction excellent in perpendicularity favorable to visibility with good light utilizing efficiency of the at least one light source. When the surface light source unit is used as a back-lighting system or as a front-lighting system, various devices such as a transmission type liquid-crystal display device which is bright and which is easy to view, a reflection-transmission double type liquid-crystal display device which is excellent in power saving, or the like, can be formed.

Incidentally, as the light source, a suitable one may be used. Preferable examples of such a suitable light source include: alinear light source such as a (cold or hot) cathode-ray tube; a point light source such as a light emission diode; an array in which such point light sources are set in a linear or planar array, or the like; a device having a combination of a point light source and a linear light pipe through which the point light source is converted into alinear light emission state; and so on. Because the light source is provided to make visibility possible in the transmission mode, the light source is not necessary to be turned on in the reflection mode. Therefore, in the reflection-transmission double type liquid-crystal display device, the light source is of a type which can be switched between turned on/off.

As occasion demands, the light source may be formed in a combined body in which suitable accessory means such as a reflector, or the like, is disposed to enclose the light source so as to guide the divergent light from the light source to the incidence side surface of the light pipe 1. As the reflector, generally, a resin sheet with a high reflectance metal thin film deposited, a metal foil sheet, or the like, may be used. The reflector may be used also as means for fixing the light source in such a manner that end portions of the reflector are bonded to end portions of the light pipe, respectively, through the adhesive agent or the like.

A suitable liquid-crystal panel can be used for the formation of the liquid-crystal display device. Examples of the suitable liquid-crystal panel include: a twisted or nontwisted liquid-crystal panel such as a TN liquid-crystal panel, an STN liquid-crystal panel, an IPS liquid-crystal panel, an HAN liquid-crystal panel, an OCB liquid-crystal panel, or a VA liquid-crystal panel; a guest-host or ferro-electric liquid-crystal panel; a light-diffuse type liquid-crystal panel; and so on. Any suitable system for driving the liquid crystal such as an active matrix system, a passive matrix system, or the like may be used without any particular limitation.

EXAMPLE 1

A mold processed into a predetermined shape in advance was filled with acrylic ultraviolet-curing resin (ARONIX UV-3701, made by TOAGOSEI Co., Ltd.) by dropping with a dropper. An 80 μm-thick triacetylcellulose (TAC) film (surface-saponified substance) was stationery on the resin and made in close contact with the resin by a rubber roller so that excessive resin and bubbles were removed. The TAC film with the resin was irradiated with ultraviolet rays by a metal halide lamp so as to be cured. Then, the TAC film with the resin cured thus was stripped off from the mold and cut into a predetermined size. Thus, there was obtained a transparent film which had a plurality of optical path changing means with a refractive index of 1.533 formed on one surface of the TAC film having a refractive index of 1.49. Then, an adhesive layer with a refractive index of 1.47 was attached onto the other surface of the transparent film on which no optical path changing means was formed.

The transparent film was 40 mm wide and 30 mm deep, and had a plurality of optical path changing means (FIG. 3B) forming continuous grooves at intervals of a pitch of 210 μm. The ridgelines of the grooves were parallel with one another in the width wise direction. The grooves had optical path control slopes A1, and steep slopes A2. Each of the optical path control slopes A1 was inclined at an inclination angle in a range of from 42.5 to 43 degrees and had a width in a range of from 10 to 14 μm. Each of the optical path control slopes A1 made a vertical angle of 70 degrees with respect to corresponding one of the steep slopes A2. The projected area of flat portions A4 on the film plane was not smaller than 10 times as large as the total projected area of the optical path control slopes A1 and steep slopes A2 on the film plane. The in-plane retardation took a constant value of 5 nm in the width wise direction.

On the other hand, a plate of polymethyl methacrylate having a thickness of 1.5 mm, a refractive index of 1.49 and a constant in-plane retardation of 11 nm in the lengthwise direction was prepared by a casting system. The polymethyl methacrylate plate was cut into transparent resin plates each of which was 42 mm wide and 32 mm deep. Then, the transparent film was bonded to one transparent resin plate through the adhesive layer to thereby obtain a light pipe.

Then, a cold-cathode tube was disposed on one of side surfaces of the light pipe and enclosed by a reflector made of a silver-vapor-deposited reflective sheet. The opposite end portions of the reflector were bonded to the upper and lower end portions of the light pipe so as to fix the cold-cathode tube. Then, a reflective sheet made of a white polyester film was disposed on the back surface of the light pipe on which the plurality of optical path changing means were formed. Thus, a surface light source unit was obtained. Then, a normally white transmission type TN liquid-crystal panel which was already available on the market was disposed on the light exit surface of the light pipe. Thus, a transmission type liquid-crystal display device was obtained.

EXAMPLE 2

A surface light source unit and a reflection-transmission double type liquid-crystal display device were obtained in the manner similar to that used in Example 1 except that a light-diffuse type silver reflective sheet was bonded, through the adhesive layer, to one surface of the light pipe on which no optical path changing means was formed, and except that the other surface of the light pipe on which the plurality of optical path changing means were formed was used as the liquid-crystal panel side.

COMPARATIVE EXAMPLE 1

A surface light source unit and a transmission type liquid-crystal display device were obtained in the manner similar to that used in Example 1 except that the transparent film was replaced by a scattering film having a surface roughened by sandblasting and having a constant in-plane retardation of 5 nm in the width wise direction to thereby form a light pipe. Incidentally, the scattering film was disposed with its rough surface disposed outside.

COMPARATIVE EXAMPLE 2

A transparent film had optical path control slopes each inclined at an inclination angle of about 30 degrees and each having a width in a range of from 11 to 16 μm. Further, a light pipe, a surface light source unit and a transmission type liquid-crystal display device were obtained in the manner similar to that used in Example 1 by using the transparent film obtained above.

COMPARATIVE EXAMPLE 3

A light pipe 40 nm wide, 30 nm deep and 1.5 nm thick was integrally injection-molded from polymethyl methacrylate so as to have a plurality of optical path changing means in the manner similar to that used in Example 2. A surface light source unit and a reflection-transmission double type liquid-crystal display device were obtained by using the light pipe obtained above.

COMPARATIVE EXAMPLE 4

A surface light source unit and a reflection-transmission double type liquid-crystal display device were obtained in the manner similar to that used in Example 2 by using the light pipe obtained in Comparative Example 2.

COMPARATIVE EXAMPLE 5

A surface light source unit and a reflection-transmission double type liquid-crystal display device were obtained in the manner similar to that used in Example 2 by using the light pipe obtained in Comparative Example 3.

EVALUATION TEST

Retardations were examined at five points, that is, four corners and one center, of the light pipe obtained in each of Examples 1 and 2 and Comparative Examples 1 to 5, so as to calculate an average retardation. In addition, frontal luminance in the center portion of the transmission type liquid-crystal display device obtained in each of Example 1 and Comparative Examples 1 and 2 was measured by a luminance meter (BM-7 made by TOPCON Corp.) in the condition that the cold-cathode tube was turned on while the liquid-crystal panel was supplied with no voltage. Further, frontal luminance in a white state of the reflection-transmission double type liquid-crystal display device obtained in each of Example 2 and Comparative Examples 3 to 5 was measured in a reflection mode in the condition that the cold-cathode tube was turned off while external light using ring-like illumination was made incident at an angle of 15 degrees.

Results of the aforementioned measurement were shown in the following Table.

|  | Average Retardation (nm) | Frontal Luminance (cd/m$^2$) | |
|---|---|---|---|
|  |  | Transmission Mode | Reflection Mode |
| Example 1 | 6 | 158 | — |
| Example 2 | 5 | 114 | 482 |
| Comparative Example 1 | 5 | 34 | — |
| Comparative Example 2 | 5 | 52 | — |
| Comparative Example 3 | 42 | 121 | 322 |
| Comparative Example 4 | 6 | 24 | 386 |
| Comparative Example 5 | 6 | 40 | 410 |

It is apparent from Table that the average retardation in each of Examples 1 and 2 and Comparative Examples 1, 2, 4 and 5 was not larger than 10 nm whereas the average retardation in Comparative Example 3 was 42 nm. In Comparative Example 3, a large retardation of 140 nm occurred particularly in a neighbor of a gate. It is further apparent from Table that, in a transmission mode, frontal luminance in Example 1 was superior to that in each of Comparative Examples 1 and 2, and frontal luminance in Example 2 was superior to that in each of Comparative Examples 4 and 5. It is further apparent from Table that, in a reflection mode, frontal luminance in Example 2 was superior to that in each of Comparative Examples 3, 4 and 5. Particularly a neighbor of a gate in Comparative Example 3 was dark so that Comparative Example 3 was inferior in uniformity of luminance. From the above description, it is proved that only Examples 1 and 2 can be put into practical use as a transmission type or reflection-transmission double type liquid-crystal display device.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A light pipe comprising:
    a transparent resin plate having an average in-plane retardation of not larger than 20 nm;
    a transparent film having an average in-plane retardation of not larger than 20 nm; and
    an adhesive layer having a refractive index different by 0.1 or less from that of said transparent film,
    wherein said transparent film is bonded to said transparent resin plate through said adhesive layer, and
    wherein said transparent film includes a repetitive prismatic structure constituted by optical path control slopes which are disposed on an outer surface of said transparent film and which are aligned in a substantially predetermined direction so that each of said optical path control slopes is inclined at an inclination angle in a range of from 35 to 48 degrees with respect to a film plane,
    wherein a projected area, onto said film plane, of flat surfaces each having an inclination angle of not larger than 5 degrees with respect to said film plane is not smaller than 10 times as large as a projected area, onto said film plane, of slopes each having an inclination angle of not smaller than 35 degrees with respect to said film plane.

2. A light pipe according to claim 1, wherein
    said optical path control slopes aligned in a substantially predetermined direction contain at least two kinds of surfaces, one kind of surfaces being a reference, the other kind of surfaces being made to face a direction opposite to said reference, and
    a refractive index difference between said transparent resin plate and said adhesive layer is not larger than 0.1.

3. A light pipe according to claim 1, wherein said inclination angle of each of said optical path control slopes with respect to said film plane is in a range of from 38 to 45 degrees.

4. A light pipe according to claim 1, wherein said optical path control slopes are formed based on a structure of grooves each substantially shaped like an isosceles triangle or any other triangle in section.

5. A light pipe according to claim 1, wherein said optical path control slopes are formed based on a structure of grooves or protrusions each substantially shaped like a tetragon or a pentagon in section.

6. A light pipe according to claim 1,
    wherein said prismatic structure is constituted by said optical path control slopes each inclined at said inclination angle in a range of from 38 to 45 degrees with respect to said film plane, and said flat surfaces each inclined at said inclination angle of not larger than 5 degrees with respect to said film plane, said flat surfaces having a width of not smaller than 10 times as large as that of said optical path control slopes, and
    wherein said prismatic structure is formed by continuous grooves from one end to the other end of said transparent film, each groove substantially being shaped like a triangle in section.

7. A light pipe according to claim 1, wherein said prismatic structure constituted by said optical path control slopes is formed by discontinuous grooves each substantially shaped like a polygon such as a triangle, a tetragon or a pentagon in section,
    wherein a length of each of said discontinuous grooves is not smaller than 5 times as large as a depth of said groove;
    wherein said optical path control slopes are formed in a direction of the length of said grooves and inclined at said inclination angle in a range of from 38 to 45 degrees with respect to said film plane, and
    wherein a projected area, onto said film plane, of said discontinuous grooves is not larger than 10 % of said film plane.

8. A light pipe according to claim 1, further comprising a reflection layer disposed closely on a surface of said transparent film on which said prismatic structure having said optical path control slopes is formed.

9. A light pipe according to claim 1, wherein ridgelines of said optical path control slopes are disposed in parallel to one side of said transparent film or with an inclination angle range of ±30 degrees with respect to said one side.

10. A light pipe according to claim 1, wherein said adhesive layer is of a light diffuse type.

11. A light pipe according to claim 1, wherein said transparent resin plate is molded from a plate by a casting system.

12. A method for producing a light pipe, comprising steps of:

forming a repetitive prismatic structure on one surface of a transparent film through a mold having a predetermined prismatic structure so that said repetitive prismatic structure has optical path control slopes which are aligned in a substantially predetermined direction and each of which is inclined at an inclination angle in a range of from 35 to 48 degrees with respect to a film plane;

providing an adhesive layer on a surface of said transparent film on which said repetitive prismatic structure is not formed;

molding said transparent film and a transparent resin plate into predetermined shapes respectively; and bonding said transparent film to said transparent resin plate through said adhesive layer provided on said transparent film, wherein a projected area, onto said film plane, of flat surfaces each having an inclination angle of not larger than 5 degrees with respect to said film plane is not smaller than 10 times as large as a projected area, onto said film plane, of slopes each having an inclination angle of not smaller than 35 degrees with respect to said film plane.

13. A method for producing a light pipe according to claim 12, wherein the step of forming said repetitive prismatic structure having said optical path control slopes includes steps of:

applying an ultraviolet-curable resin on one surface of said transparent film to thereby form a coating layer of said ultraviolet-curable resin;

curing said coating layer of said ultraviolet-curable resin by irradiation with ultraviolet rays while bringing said coating layer into close contact with a surface of said mold on which a predetermined prismatic structure is formed; and stripping said transparent film off from said mold to collect said transparent film.

14. A method for producing a light pipe according to claim 12, wherein the step of molding said transparent resin plate into said predetermined shape includes the step of cutting a resin plate formed by a casting system into a predetermined shape.

15. A method for producing a light pipe according to claim 12, wherein the step of bonding said transparent film to said transparent resin plate through said adhesive layer provided on said transparent film includes steps of:

bonding said transparent film to said transparent resin plate through said adhesive layer; and fixing said transparent film to said transparent resin plate by heat and under pressure.

16. A light pipe comprising:

a transparent resin plate having an average in-plane retardation of not larger than 20 nm;

a transparent film having an average in-plane retardation of not larger than 20 nm; and an adhesive layer having a refractive index different by 0.1 or less from that of said transparent film, wherein said transparent film is bonded to a first surface of said transparent resin plate through said adhesive layer, and wherein said transparent film includes a repetitive prismatic structure constituted by optical path control slopes which are disposed on an outer surface of said transparent film and which are aligned in a substantially predetermined direction so that each of said optical path control slopes is inclined at an inclination angle in a range of from 35 to 48 degrees with respect to a film plane, and wherein said optical path control slopes face an incidence side surface of the light pipe, and wherein a second surface of said transparent resin plate, that is opposite to said first surface and not bonded to said transparent film, is formed as a flat surface and functions as a light emitting surface.

17. A method for producing a light pipe having a transparent resin plate having an average in-plane retardation of not larger than 20 nm, said transparent resin plate having a first and second surface; a transparent film having an average in-plane retardation of not larger than 20 nm; and an adhesive layer having a refractive index different by 0.1 or less from that of said transparent film, and wherein said second surface of said transparent resin plate, that is opposite to said first surface, has a flat surface comprising steps of:

forming a repetitive prismatic structure on one surface of the transparent film through a mold having a predetermined prismatic structure so that said repetitive prismatic structure has optical path control slopes which are aligned in a substantially predetermined direction and each of which is inclined at an inclination angle in a range of from 35 to 48 degrees with respect to a film plane;

providing the adhesive layer on a surface of said transparent film on which said repetitive prismatic structure is not formed;

molding said transparent film and said transparent resin plate into predetermined shapes respectively; and bonding said transparent film to first surface of said transparent resin plate through said adhesive layer provided on said transparent film, wherein a projected area, onto said film plane, of flat surfaces each having an inclination angle of not larger than 5 degrees with respect to said film plane is not smaller than 10 times as large as a projected area, onto said film plane, of slopes each having an inclination angle of not smaller than 35 degrees with respect to said film plane.

* * * * *